Dec. 16, 1947. G. J. STREZYNSKI 2,432,829
APPARATUS FOR USE IN THE CENTRIFUGAL SEPARATION
OF SERUM FROM CHEESE CONSTITUENTS
Filed Nov. 10, 1944 3 Sheets-Sheet 3

WITNESS:

INVENTOR
George J. Strezynski
BY
Bruer and Harding
ATTORNEYS.

Patented Dec. 16, 1947

2,432,829

UNITED STATES PATENT OFFICE 2,432,829

APPARATUS FOR USE IN THE CENTRIFUGAL SEPARATION OF SERUM FROM CHEESE CONSTITUENTS

George J. Strezynski, Chicago, Ill., assignor to The De Laval Separator Company, New York, N. Y., a corporation of New Jersey Application November 10, 1944, Serial No. 562,786

13 Claims. (Cl. 233—4)

In the manufacture of various kinds of cheese, it is customary to take curdled milk or its equivalent, add thereto butterfat in proportions varying from nought to ten per cent. of the total mix, dependent on the kind of cheese to be made, subject the mixture to the action of a homogenizer, and then, by a long established conventional procedure, including a prolonged period of drainage, separate the whey or serum, leaving a product composed mainly of butterfat and milk solids. One of the serious objections to the conventional method of cheese manufacture is that the prolonged time required for the separation of the whey or serum effects physical or chemical changes, or both, that deleteriously affect the flavor, and particularly the keeping qualities, of the cheese.

A primary object of my invention is to produce cheese of superior flavor whose keeping qualities are greatly superior to cheese produced by conventional methods. I have found that if the separation of whey or serum is effected promptly and rapidly after homogenization, the cheese will suffer no deterioration even if kept in storage for a period of time long exceeding that which would normally elapse between the date of manufacture of the marketable product and the dates of its sale and consumption. I have found also that it is practicable to effect rapid separation of the whey or serum by centrifugal force. However, centrifuges of conventional type—whether adapted to separate liquids of different specific gravities, as, for example, in the separation of cream from whole milk, or to separate liquids from solids, whether the solids are heavier or lighter than the liquid, as, for example, in the separation of wax from a chilled solution of mineral oil and diluent—are not adapted to the separation of the whey or serum from the butterfat and solids constituting the cheese constituents. I have found it necessary, in order to satisfactorily accomplish this purpose, to design a special type of centrifugal separator. Such a separator forms the subject matter of an application filed April 20, 1944, Serial No. 531,908. I have also found it necessary to provide special auxiliary means to insure the continuous discharge of the cheese constituents from the centrifuge, to prevent clogging of the separated cheese constituents beyond said outlet, to prevent aeration of the discharged cheese constituents and to effect the continuous conveyance of the cheese constituents toward their ultimate receiver. With these I have combined means to add salt and/or other materials that add flavor and improve the consistency or texture of the cheese. These auxiliary means form the subject matter of the present invention.

Fig. 1, illustrating one embodiment of the invention, is a side view, partly in section, of a bowl and a sectional view of the covers with auxiliary mechanism.

Figure 1:
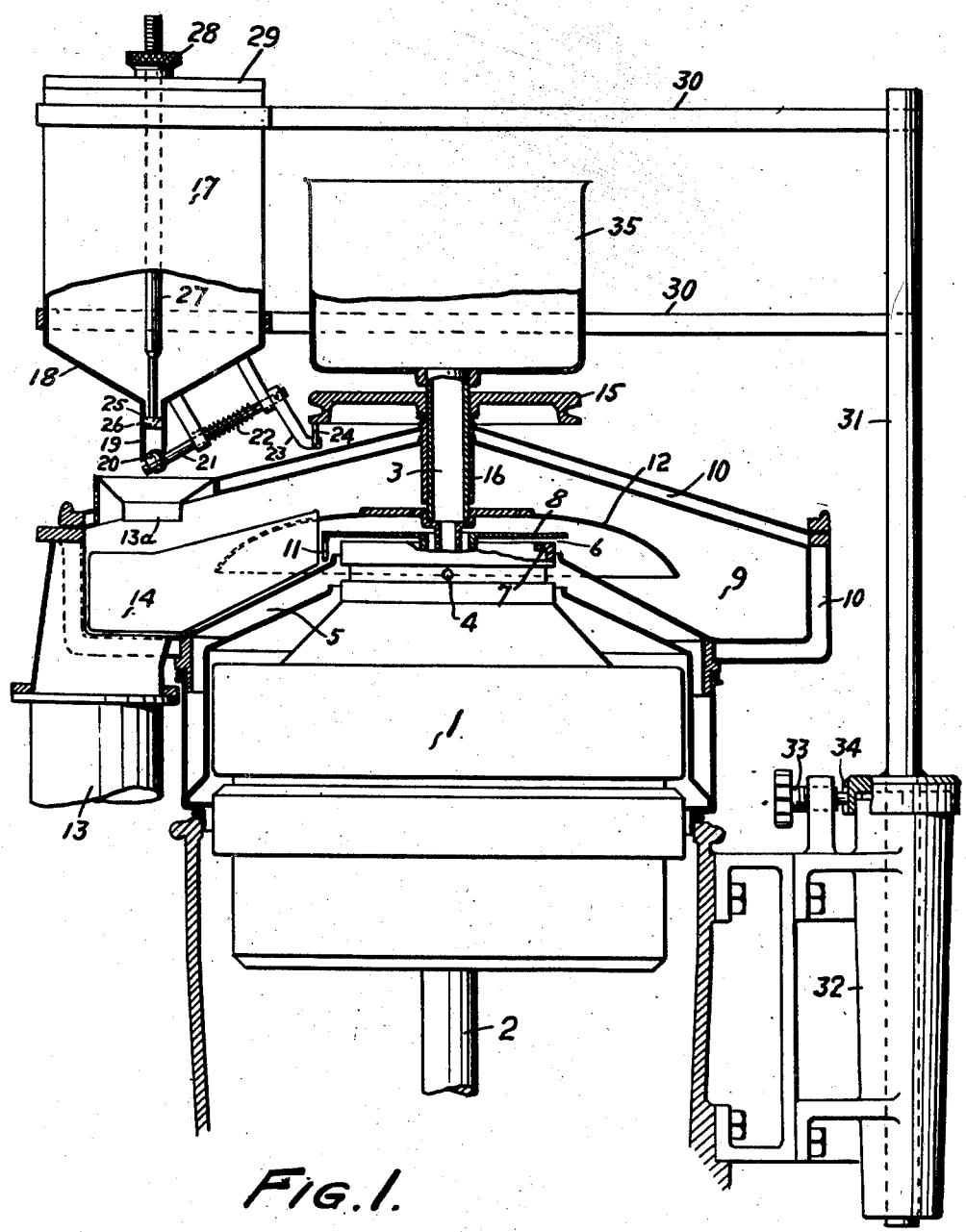

The centrifugal bowl 1 is mounted on and driven by a spindle 2. The mixture to be separated is fed from a supply vessel 35 through a tube 3 into the bowl 1 wherein it is separated into serum (which escapes through outlets 4 into a receiving chamber 5 having a spout, not shown, for discharge into the ultimate receptacle) and cheese (which flows into another receptacle inside the annular flange 7 and below the cover 8 secured to the bowl, and escapes therefrom through the narrow opening 6 from which it flies outward in a fine spray into a chamber 9). The centrifugal bowl is not herein described in further detail, since the bowl per se is not the invention herein claimed. Any bowl may be utilized that will effectually separate the cheese constituents from the serum and that is adapted to cooperate with the auxiliary means constituting the invention herein claimed.

The temperature of the mixture fed through the tube 3 should be above 140° F. and below the boiling point of the liquid constituent of the mixture, a temperature of about 160° F. being preferable; and this temperature is maintained or nearly maintained, within the bowl. Because subjection of the mixture to prolonged high temperatures may cause chemical changes that may result in irregular operation, the heat should be applied quickly in a continuous heater located near to the centrifuge. It is desirable to maintain heated, although not necessarily or desirably to the temperature within the centrifugal bowl, the receiving pan 9, and this may be effected by a jacket 10. If the pan is thoroughly insulated, the desired temperature will be attained within a few minutes at the start of a run and maintained until the end of the run. Nevertheless there is a tendency toward clogging just beyond the inner edge of the upper wall of the chamber 5. This is prevented by a cutter 11 that projects downward from the cover 8 and shaves away any slight accumulation of cheese that may form in a single revolution of the bowl.

Due partly to the drop in temperature in the receiving pan 9, but due mainly to the discharge of the cheese in a fine spray into the receiving pan, substantial and undesirable aeration of the cheese would occur if no means were provided to prevent it. I have found that the provision of a hood 12 of restricted diameter extending into the receiving pan 9 and down to below the level of the cheese discharge effectually prevents such aeration.

The separated cheese constituent leaves the receiving pan 9 through a hole in its bottom, passing thence into a pipe 13 leading to an ultimate receiver (not shown). In order to sweep the cheese around the receiver into the pipe 13 there are provided one or more scrapers or conveyors 14, which are given a slow movement of rotation. Such a conveyor is desirably a wing or vane extending (radially or somewhat backward from a radial line) from the edge of the cover 8 toward and just clearing the outer wall of the receiving pan 9 and extending upward from just barely above the bottom of the receiving pan 9. The said movement of rotation may be effected by securing the wing 14 to the hood 12 and by securing the hood 12 to the feed pipe 3 which may be rotated slowly by a belt (not shown) engaging a pulley 15 on said pipe. The feed pipe 3 is supported by and for rotation within a sleeve 16 supported by the upper wall of the chamber 9.

I have found it desirable to locate the chamber 9 for reception and discharge of cheese above the chamber 5 for reception and discharge of serum because it can there be more readily equipped with the hereinbefore described mechanism for sweeping the cheese out of the cover and can be more readily insulated to avoid heat losses and enclosed to exclude air that would cause oxidation. It would be difficult to apply these to a lower cover.

In order to add proportionate quantities of flavoring and/or other desirable materials to the cheese as it is separated I have provided a container 17 for such material and means to add a small quantity thereof to each quantity of cheese delivered by the conveyor 14. The container 17 has a conical bottom 18 terminating at the top of a tube 19 having its bottom closed by a button 20 on the end of a short arm and carried on a rock shaft 21. The shaft 21 has, coiled around it, a spring 22 that urges the button 20 toward the end of the tube 19 and, attached to its distant end, a lever 23 that projects into the path of a lug 24 on the pulley 15. Inside the tube 19 is a free fitting plug 25 having therein a groove 26 and supported by a rod 27 with a threaded upper portion engaged by a nut 28 resting on the top 29 of the container 17. By turning the nut 28 the rod 27 and plug 25 may be moved up or down till the space between the plug and the button 20 will hold the desired amount of additive material.

Each time that the conveyor 14 reaches the opening into the pipe 13 the lug 24 on the pulley 15 contacts the lever 23 which, through the shaft 21 and the intermediate arm, moves the button 20 away from the end of the tube 17 and allows the material between the button and the plug 25 to fall into the pipe 13. The subsequent homogenization mixes each little quantity of additive material with its small quantity of cheese. The groove 26, while small enough to prevent any appreciable quantity of material from flowing through it during the short time that the end of the tube 19 is open, is large enough to allow, during the much longer time that the tube is closed, the passage of the quantity holdable between the plug and the button. The rapid fine vibration, always present in large centrifuges, assists this flow.

It should be understood, however, that the addition of measured quantities of flavoring and/or other desirable materials to the cheese may be effected by more simple means than that described. For example, the rod 27 and the grooved plug 25 may be omitted and the cam 24 so shaped as to unseat the button 20, at predetermined intervals, for the very short predetermined time required to allow a definite quantity of additive material to be released from the container 17. Indeed, if the outlet from container 17, that is, the diameter of tube 19, is sufficiently restricted, the mechanism which comprises the elements 20, 21, 22, 23 and 24, as well as the elements 27 and 25, may be omitted, and the feed of additive material thus made continuous.

The container 17 is supported by arms 30 projecting from a post 31 revolvably supported in a bracket 32, shown in the figure 90° from its proper location. A screw 33, when entered in a groove 34, locks the post in position to hold the tube 19 directly above the pipe 13 and the hole 13a in the top of the covers. When the screw 33 is loosened the arms 30 and container 17 may be swung to one side to permit ready access to and removal of the covers and the bowl.

Figure 2:
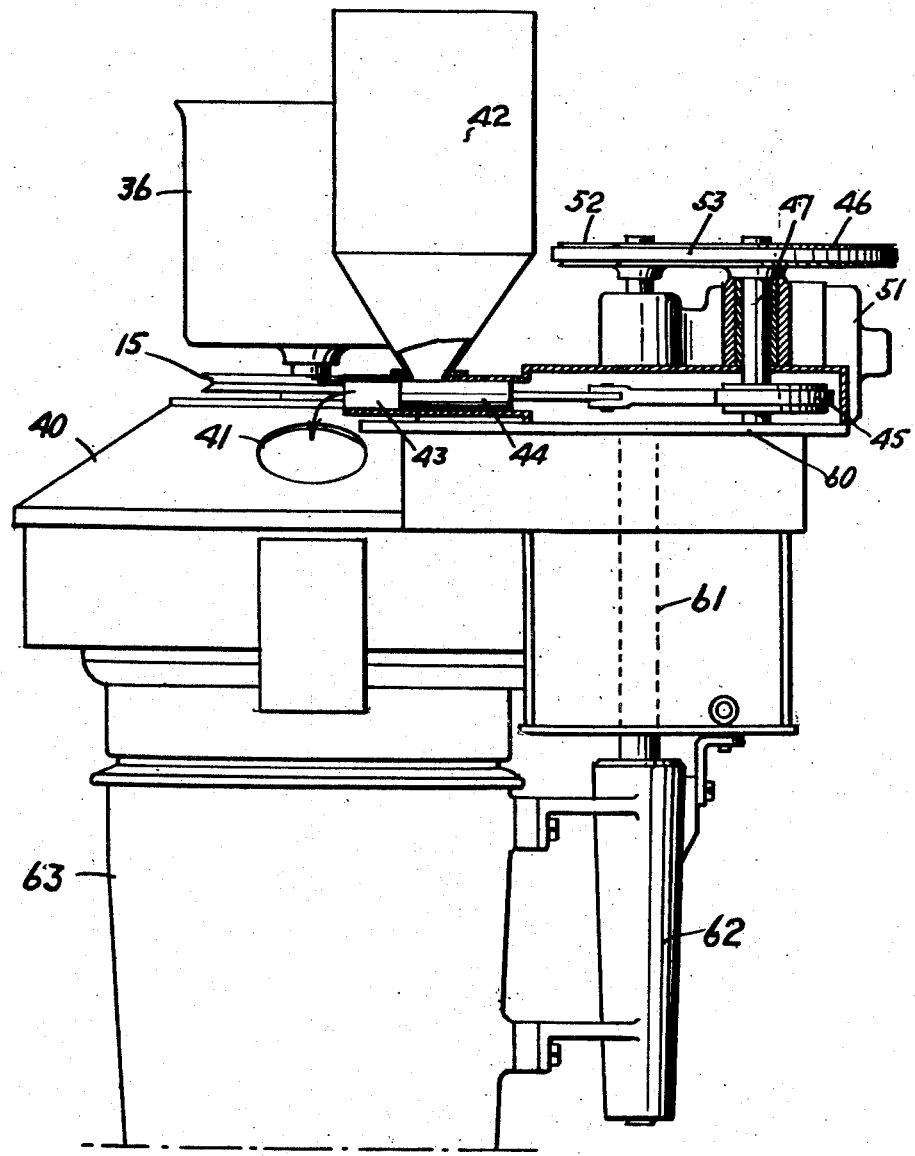
Fig. 2 is a similar view of another embodiment of the invention.
Figure 3:
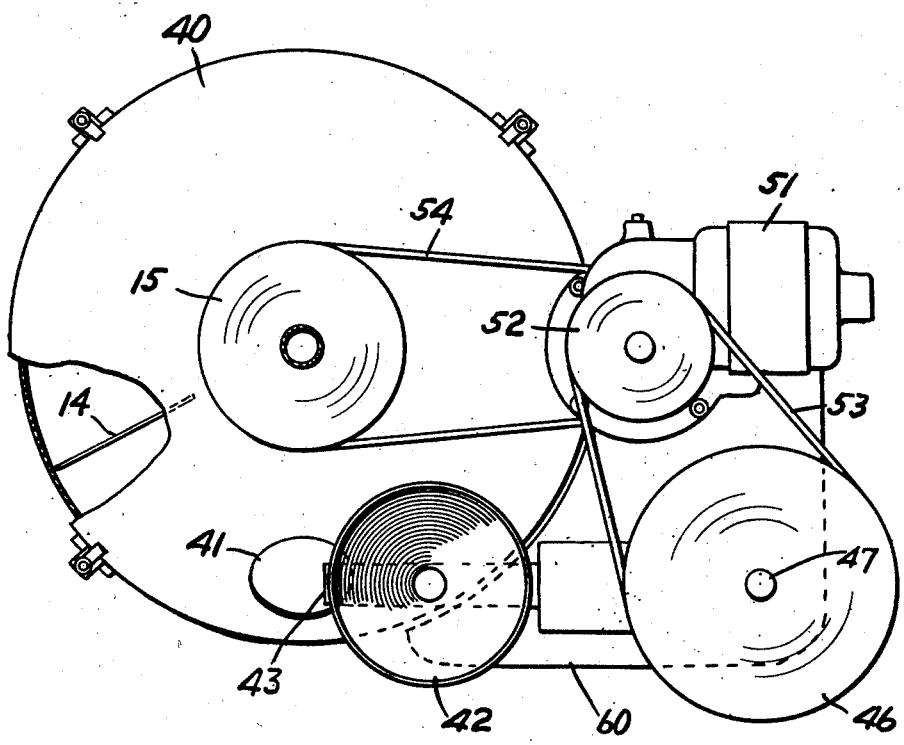
Fig. 3 is a plan view of the structure of Fig. 2.

Other mechanism for feeding salt, gum or other additive material from a container to the receiving pan is shown in Figs. 2 and 3, said mechanism also including means to vary the rate of feed. In these figures, 36 is the supply vessel for the liquid to be separated, 40 is the receiving pan corresponding to the pan 9 of Fig. 1 and 41 the opening thereinto corresponding to the opening 13a of Fig. 1. 42 is a salt tank, corresponding to the salt-container 17 of Fig. 1, whose bottom opening feeds into a tube 43. Reciprocating in the tube 43 is a piston 44 operated by an eccentric 45 on a shaft 47 driven by a pulley 46, which, through a pulley 52 and belt 53, is driven, as hereinafter described, from a motor 51. As the piston recedes (toward the right in Fig. 2), the space in front of it fills with salt (or salt and gum or other additive) from the tank 42. Then, as the piston advances (toward the left, Fig. 2) it pushes the whole, or a definite portion, of the salt in front of it toward and into the opening 41. The amount of salt fed at each reciprocation can be readily regulated by the eccentricity of eccentric 45.

As in Fig. 1, the modification shown in Figs. 2 and 3 comprises scrapers or conveyors 14, which may be driven, as in Fig. 1, from a pulley 15 on the top of the cover of the receiving pan. The motor 51 is of the gear-in-head type with a shaft extension both above and below the head. The shaft extension above the head carries the pulley 52. The shaft extension below the head carries a pulley (not shown) which is connected, by a belt 54, to the pulley 15.

The motor 51, salt hopper 42, salt feeder 44 and auxiliary mechanism are set on a platform 60, which is mounted on a post 61 swivelled in a bracket 62, supported from the frame 63, which encloses the centrifuge, so that the entire equipment may be swung away from the centrifuge and receiving pans to allow dismantling and cleaning.

What I claim and desire to protect by Letters Patent is:

1. In a centrifugal apparatus adapted especially for the separation of cheese constituents from whey or serum, the combination, with a centrifuge provided with outlets for the separated constituents, of a stationary receiver of relatively large diameter surrounding the upper part of the centrifuge and adapted to receive the cheese constituents discharged from one of said outlets and having a floor sloping downward toward its periphery and provided near its periphery with a bottom outlet, a conveyor wing in said receiver extending lengthwise from near the last named outlet with its lower edge extending along the floor of the receiver and its outer edge extending close to the peripheral wall of the receiver, and means to rotate said wing at a speed slow relatively to the speed of rotation of the centrifuge to thereby sweep the discharged cheese constituents in an arcuate direction toward said outlet.

2. In a centrifugal apparatus adapted especially for the separation of cheese constituents from whey or serum, the combination, with a centrifuge provided with outlets for the separated constituents, of a stationary receiver of relatively large diameter surrounding the upper part of the centrifuge and adapted to receive the cheese constituents discharged from the centrifuge, said receiver having a bottom outlet near its periphery, a hood of relatively small diameter extending into said receiver and surrounding the outlet from the centrifuge, means independent of the bowl to rotate said hood at a speed slow relative to the speed of rotation of the centrifuge, and a conveyor wing carried by said hood and turnable therewith and adapted to sweep the cheese constituents discharged into said receiver toward said bottom outlet.

3. In a centrifugal apparatus adapted especially for the separation of cheese constituents from whey or serum, the combination, with a centrifugal bowl having an outlet from its separating chamber for the separated cheese constituent, of a receptacle rotatable with said bowl and communicating with, and receiving the cheese constituent from, said outlet, said receptacle having a narrow annular opening through which said separated cheese constituent is discharged as a fine spray, a stationary receiver of relatively larger diameter surrounding said opening and having a bottom outlet near its periphery, a hood of relatively small diameter surrounding said opening and extending from above said opening to below the level of said opening, a conveyor wing carried by said hood, and means independent of the bowl rotating means to rotate said hood and wing at a relatively slow speed.

4. In a centrifugal apparatus adapted especially for the separation of cheese constituents from whey or serum, the combination, with the separating compartment having outlets therefrom for the respective separated constituents, of a lower receptacle rotatable with the bowl and communicating with the outlet for the serum, an upper receptacle rotatable with the bowl and communicating with the outlet for the cheese constituents, the outlet for the cheese being a narrow annular opening, stationary receivers for cheese and serum, the upper wall of the receiver for the serum terminating below said cheese opening near to but spaced from said annular opening, and a cutter located outside said annular opening and extending down close to and outside of the inner edge of the upper wall of the lower receiver.

5. In a centrifugal apparatus adapted especially for the separation of cheese constituents from whey or serum, the combination, with a centrifugal bowl provided with outlets for the separated constituents, of a stationary receiver of relatively large diameter surrounding the upper part of the centrifuge and adapted to receive the separated cheese constituents and having a bottom outlet, and a rotatable conveyor wing in said receiver whereby the discharged cheese constituents are swept to said outlet, of a container for additive material and means movable in synchronism with said wing to effect the discharge from the container into the receiver of a measured quantity of said additive material while said wing is moving through a minor arc of its revolution.

6. In a centrifugal apparatus adapted especially for the separation of cheese constituents from whey or serum, the combination, with a centrifugal bowl provided with outlets for the separated constituents, a stationary receiver of relatively large diameter surrounding the upper part of the centrifuge and adapted to receive the separated cheese constituents and having a bottom outlet, and a rotationable conveyor wing in said receiver whereby the discharged cheese constituents are swept to said outlet, of a container for additive material having a discharge opening therefrom, a valve normally closing said opening, and means movable in synchronism with said wing to open said valve and allow a small quantity of additive material to escape through said discharge opening into the receiver.

7. In a centrifugal apparatus adapted especially for the separation of cheese constituents from whey or serum, the combination, with a centrifugal bowl provided with outlets for the separated constituents, a stationary receiver of relatively large diameter surrounding the upper part of the centrifuge and adapted to receive the separated cheese constituents and having a bottom outlet, and a rotatable conveyor wing in said receiver whereby the discharged cheese constituents are swept to said outlet, of a container for additive material having a discharge opening therefrom, a valve normally closing said opening, means above said valve providing a space for a small fractional quantity of said additive material and a channel through which said space may be filled with additive material from the body of the container while the valve is closed, and means movable in synchronism with said wing to open said valve while said wing is moving through a minor arc of its rotation and thus allow the additive material fed to said space to be released therefrom into the receiver.

8. In a centrifugal apparatus adapted especially for the separation of cheese constituents from whey or serum, the combination, with a centrifugal bowl provided with outlets for the separated constituents, a stationary receiver of relatively large diameter surrounding the upper part of the centrifuge and adapted to receive the separated cheese constituents and having a bottom outlet, and a rotatable conveyor wing in said receiver whereby the discharged cheese constituents are swept to said outlet, of a container for additive materials, a valve at the bottom of said container and an adjustable plug in said container and above said valve, whereby the space above and adjacent said valve may be varied, a lever operably connected to said valve and a lug movable in synchronism with said wing into operable contact with said lever whereby the valve may be intermittently opened.

9. An apparatus as defined in claim 5 comprising a device between said container outlet and said receiver for positively feeding the additive material from said outlet to said receiver.

10. An apparatus as defined in claim 5 comprising mechanism adapted to positively feed the additive material from said outlet to said receiver, said mechanism comprising means to vary the rate of feed.

11. An apparatus as defined in claim 5 comprising a reciprocating piston adapted to intermittently feed to the receiver measured quantities of said additive material delivered from said outlet.

12. In a centrifugal apparatus adapted especially for the separation of cheese constituents from whey or serum, the combination, with a centrifugal bowl provided with outlets for the separated constituents, of a stationary receiver of relatively large diameter surrounding the upper part of the centrifuge and adapted to receive the separated cheese constituents and having an outlet, a rotatable conveying and scraping device in said receiver whereby the cheese constituents discharged into said receiver are swept toward said outlet, a container for additive material, a motor, means operable by the motor to actuate said conveying and scraping device, and a platform on which said motor and container are mounted, said platform being mounted on a vertical axis to enable the equipment carried thereby to be swung away from the centrifuge to allow dismantling and cleaning.

13. In a centrifugal apparatus adapted especially for the separation of cheese constituents from whey or serum, the combination, with a centrifugal bowl provided with outlets for the separated constituents, of a stationary receiver of relatively large diameter surrounding the upper part of the centrifuge and adapted to receive the separated cheese constituents and having an outlet, a rotatable conveying and scraping device in said receiver whereby the cheese constituents discharged into said receiver are swept toward said outlet, a container for additive material, a motor, means operable by the motor to actuate said conveying and scraping device, means operable by the motor to feed said additive material from the container outlet to the receiver; and a platform on which said motor, container and feeding means are mounted, said platform being mounted on a vertical axis to enable the equipment carried thereby to be swung away from the centrifuge to allow dismantling and cleaning.

GEORGE J. STREZYNSKI.

REFERENCES CITED

The following references are of record in the file of this patent:

UNITED STATES PATENTS

| Number | Name | Date |
|---|---|---|
| 949,603 | Shepherd | Feb. 15, 1910 |
| 1,634,243 | Vones | June 28, 1927 |
| 895,489 | Morse | Aug. 11, 1908 |